J. U. McDONALD.
APPARATUS FOR MAKING GAS.
APPLICATION FILED NOV. 22, 1916.
1,278,180.
Patented Sept. 10, 1918.
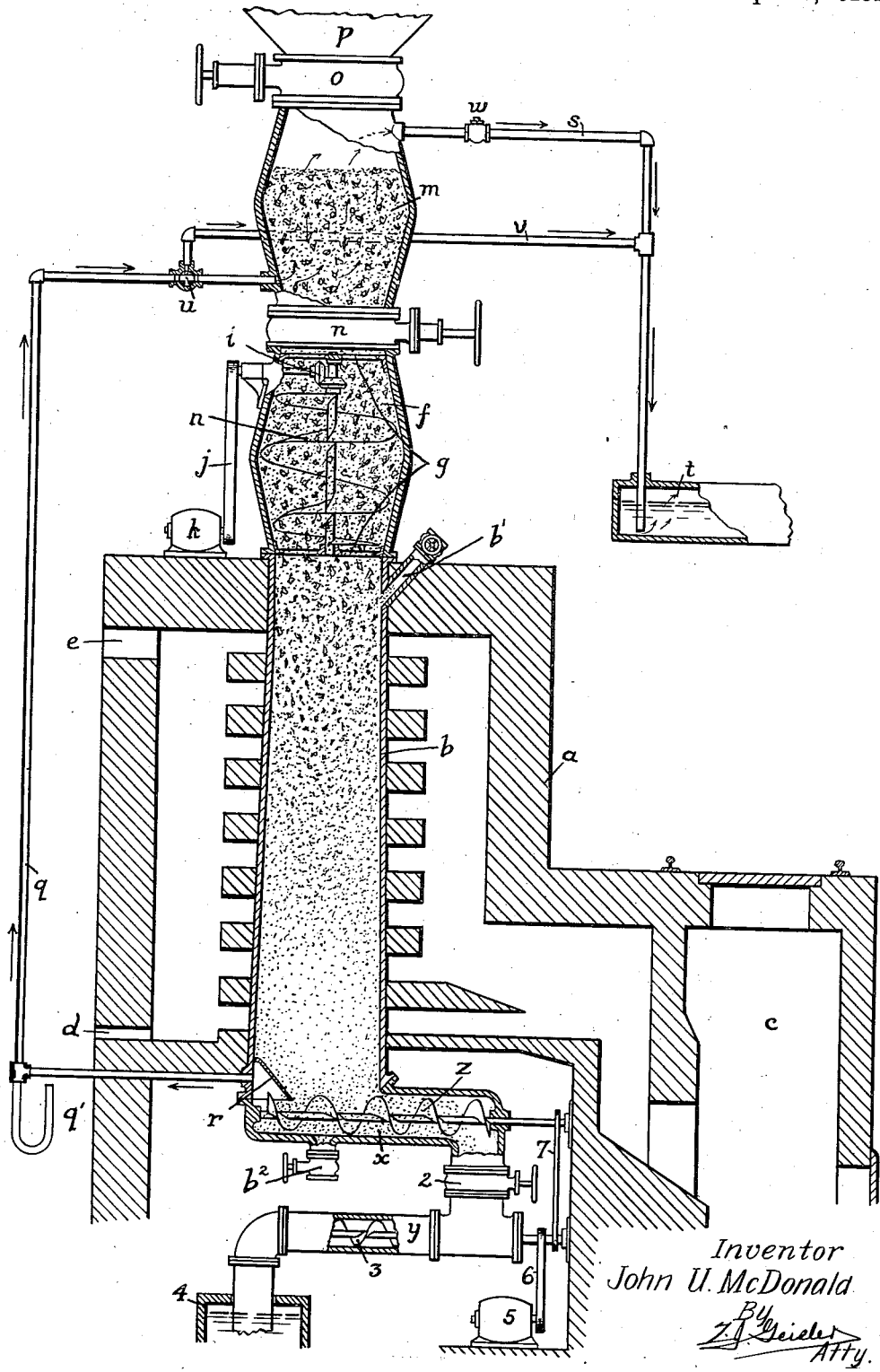
Inventor
John U. McDonald

UNITED STATES PATENT OFFICE.

JOHN U. McDONALD, OF LA GRANDE, OREGON, ASSIGNOR TO AMERICAN GAS AND INCINERATOR COMPANY, OF TACOMA, WASHINGTON, A CORPORATION OF WASHINGTON.

APPARATUS FOR MAKING GAS.

1,278,180.

Specification of Letters Patent.   Patented Sept. 10, 1918.

Application filed November 22, 1916.   Serial No. 132,908.

*To all whom it may concern:*

Be it known that I, JOHN URBAN MC-DONALD, a citizen of the United States, and a resident of La Grande, Union county, State of Oregon, have invented a certain new and useful Improvement in Apparatus for Making Gas, of which the following is a specification.

My invention relates to the manufacturing of gas for illuminating and power purposes by the destructive distillation of all kinds of carbonaceous matter, especially sawdust and other sawmill refuse, garbage and organic material in general.

The object of my invention is to make gas of the materials mentioned by an efficient process and apparatus; in other words, manufacturing a high grade of fixed gas at minimum cost, and without using any foreign substance for enriching the gas produced.

It is further my object to convert practically all the gas producing constituents of the material into gas, including by-products, such as tar, coke or charcoal, as the case may be, and a good portion of the moisture content. In so doing I obtain a larger yield of gas, and, incidentally, I transfer substantially all the heat units contained in the solid material to the gas, and thereby obtain a greater revenue from the gas produced from such by-products than could be obtained from selling the same.

I attain my object by the following method, using in connection therewith the apparatus hereinafter described: The material is heated in a vertical retort, which is kept filled by an automatic continuous feed, operating by gravity and mechanical force, whereby the feed of the material into the retort is carried on relatively to the working capacity of my apparatus, which is determined by the degree of heat at which the retort may be maintained under a given load. In other words, the rate of feeding material into the retort must be proportioned to the capacity of the latter to complete the distillation of the material which it holds. The rate of speed must also be sufficiently slow to prevent undue steam generation and pressure, which would tend to carry solid matter into the gas off-take pipe from the retort, and so clog the former. Sawdust and garbage have an excess of moisture which must be taken care of in the distillation of these materials into gas. The temperature of the retort is controlled by damper regulations as usual.

The gaseous products are required to pass downward through a mass of incandescent carbonaceous matter contained in the bottom of the retort; and from thence the gas is conducted through the mass of material contained in the charging chamber located above the feeding chamber and serving the double purpose of cooling the hot gas by bringing it into contact with and permitting it to impart its heat to, green material, and, incidentally preheating the latter by passing the hot gas through it. The same step also causes the frictional contact of the gas with the material in the charge chamber to deposit its tarry matter on such material, and these tarry matters are then again carried back into the retort with the green material, and are further distilled.

The drawing represents a diagrammatic section of my apparatus.

*a* represents a heating chamber in which the vertical retort, *b*, is mounted; the heating chamber *a* being heated by a furnace *c*, and the heating chamber being adapted to cause the heat to completely envelop all parts of the retort. *d* is an auxiliary air opening, and *e* is the flue opening.

On the retort *b* is mounted a feeding chamber *f* having at its ends spiders *g*, providing the bearings for a vertical, helical conveyer *h*. By the latter the material in the feeding chamber *f* is fed into the retort *b* by gravity and mechanical force, the rate of speed of such feeding being adjusted relatively to the degree of heat desired and maintainable in the retort under a given load, as already mentioned. The helical conveyer *h* is driven by suitable devices, for example, bevel gears *i*, belt *j*, and motor *k*.

A charge chamber *m* is mounted above the feeding chamber *f*. A gate *n* controls the opening between the chambers *f* and *m*, and a similar gate *o* controls the opening into the charge chamber *m*. A hopper *p* discharges from a bunker (not shown) into the charge chamber *m* when the gate *o* is opened. A gas off-take pipe *q* leads from the base of the retort *b*; the inlet end of the pipe being protected by a baffle *r* so as to prevent material from the retort clogging the pipe. The upper end of the pipe $q$ leads into the lower end of the charge chamber $m$. A gas pipe $s$ leads from the upper end of the chamber $m$ to a hydraulic main $t$, which extends to a gas-holder (not shown). A two-way valve $u$ is located in the pipe $q$ and may be positioned to bypass the gas from the pipe $q$ to the pipe $s$ through the bypass pipe $v$. A check valve $w$ in the pipe $s$ prevents gas from flowing back into the charge chamber $m$ when the gas is bypassed through the pipe $v$; such being necessary when the charge chamber is open to receive a charge of material from the hopper $p$.

A horizontal chamber $x$ is located under the retort $b$, and in such chamber is rotated a helical conveyer $z$, whereby the coke and waste are expelled from time to time. The chamber $x$ has an outlet end opening downward and connecting with a lower, horizontal chamber $y$; the opening being controlled by a gate 2. In the chamber $y$ rotates a helical conveyer 3, which moves the material to the outlet end of the chamber $y$ and discharges it into a pit 4 containing water, from which the coke and waste may be removed. The conveyers $z$ and 3 are operated as required by the motor 5 and driving connections 6 and 7.

The retort is provided with a stoking opening $b'$ at the top and with another stoking opening $b^2$ at the bottom, each closed by a gate.

In first starting up my apparatus, the retort $b$ is filled with the carbonaceous material.

In the continued operation of my apparatus further material is fed from time to time from the hopper $p$ through the gate $o$ into the charge chamber $m$. The gate $o$ at the upper part of said charge chamber is then closed, and the gate $n$ in the bottom thereof is opened, so as to drop the charge into the feeding chamber $f$. The gate $n$ between the charge chamber and the feeding chamber is then closed, and the helical conveyer $h$ is operated to feed the material at a predetermined rate of speed into the retort $b$. In the latter the mass will be first converted into incandescent carbonaceous material, and the latter will then be broken up further into its gas producing constituents, and the coke and waste. There will always be a body of incandescent carbonaceous material in the bottom of the retort; and as fast as such material is completely distilled it will be replaced by the fresh material introduced from the feeding chamber $f$; and, as evident, the rate of such feeding can be adjusted and maintained relatively to the heating capacity of the retort and the capacity of the means for heating the latter. The produced gas is emitted from the base of the retort through the pipe $q$ into the charge chamber $m$, where it is obliged to pass through the charge of green material, and finally passes out through the pipe $s$ into the hydraulic main $t$. In passing through the charge of material contained in the charge chamber $m$ two results are obtained, as already mentioned: the gas is cooled, and in cooling imparts its heat to the charge of material in said chamber. In so doing a scrubbing effect is obtained, the tarry matters being deposited on the material in the charge chamber $m$, and the surplus moisture being also, to the greater extent, there condensed. Such deleterious products as are carried by the gas through the material in the chamber $m$ are deposited in the hydraulic main. Since the tarry matter is capable of being converted into gas, the deposit thereof on the material contained in the charge chamber $m$ causes such tarry matter to be again run through the retort; and in this way all gas producing constituents of the material are practically used up, and in an efficient manner. In passing the gas from the retort through the pipe $q$, the condensed surplus moisture is continuously discharged by overflowing from the open end of the U-pipe $q'$, in so doing maintaining a constant water-seal in the latter for preventing the escape of the gas.

The volatile hydro-carbons in the carbonaceous matter in the charge will be released to a large extent before the charge becomes incandescent and the moisture contained in the charge will become superheated steam. A certain amount of pressure accumulates in the upper part of the retort above the incandescent zone which forces the steam and gas to pass down through the very hot carbonaceous material. The result is the production of a mixture of carbon monoxid, marsh gas, methane and water gas, and at the same time, the forming of a zone of practically incandescent material. This destructive distillation or gasifying of the carbonaceous material may be carried on to any desired extent, and any remaining carbon may be removed by means of the conveyer Z and used to heat the retort.

The principal departure of this invention from the devices of the prior art is in the retort being so constructed that the steam and gases first produced are forced to pass down from the upper part of the retort through an incandescent layer where the very hot carbon will unite with the oxygen and hydrogen to produce a maximum amount of gas suitable for heating and power, and which action results in great heat that facilitates a continuance of such action.

I claim:

1. A gas apparatus comprising a vertical retort and heating means therefor, a feeding chamber above the retort, mechanically operated means for effecting a continuous feed at variable speed from said feeding chamber into the retort, a charge chamber above the feeding chamber, a gate between the charge chamber and the feeding chamber, a hopper above the charge chamber, a gate between the hopper and said charge chamber, a pipe leading from the lower end of the retort to the lower end of the charge chamber, another pipe leading from the upper end of the latter to the hydraulic main, a bypass connecting the gas pipes exterior of said charge chamber, and means for removing residue material from the retort.

2. A gas apparatus comprising a vertical retort and heating means therefor, a feeding chamber above the retort, a helical conveyer in said feeding chamber and means for driving the same at variable speed, a charge chamber above the feeding chamber, a gate between the charge chamber and the feeding chamber, a hopper above the charge chamber, a gate between the hopper and said charge chamber, a pipe leading from the lower end of the retort to the lower end of the charge chamber, another pipe leading from the upper end of the latter to the hydraulic main, a bypass connecting said gas pipes exterior of said charge chamber, and means for removing residue material from the retort.

3. A gas apparatus comprising a vertical retort and heating means therefor, a feeding chamber above the retort, mechanically operated means for effecting a continuous feed at variable speed from said feeding chamber into the retort, a charge chamber above the feeding chamber, a gate between the charge chamber and the feeding chamber, a hopper above the charge chamber, a gate between the hopper and said charge chamber, a pipe leading from the lower end of the retort to the lower end of the charge chamber, another pipe leading from the upper end of the latter to the hydraulic main, a bypass connecting said gas pipes exterior of said charge chamber, a horizontal chamber under the retort, a second, lower-plane, horizontal chamber, a gate between these two chambers and a conveyer in each chamber, and a water pit into which the lower chamber discharges.

4. A gas apparatus comprising a vertical retort and heating means therefor, a feeding chamber above the retort, a helical conveyer in said feeding chamber and means for driving the same at variable speed, a charge chamber above the feeding chamber, a gate between the charge chamber and the feeding chamber, a hopper above the charge chamber, a gate between the hopper and said charge chamber, a pipe leading from the lower end of the retort to the lower end of the charge chamber, another pipe leading from the upper end of the latter to the hydraulic main, a bypass connecting said gas pipes exterior of said charge chamber, a horizontal chamber under the retort, a second, lower-plane, horizontal chamber, a gate between these two chambers and a conveyer in each chamber, and a water pit into which the lower chamber discharges.

5. In a gas apparatus, the combination of a vertical retort and heating means therefor, a charge chamber, a hopper above the charge chamber, a gate between the hopper and said charge chamber, mechanical means mounted below the charge chamber for effecting a continuous feed to the retort, a pipe leading directly from the lower end of the retort to the lower end of the charge chamber, and another pipe leading from the upper end of the latter to the hydraulic main.

6. In a gas apparatus, the combination of a retort and heating means therefor, a feeding chamber at the inlet end of the retort, mechanical means, operable at variable speed, for effecting a continuous feed from the feeding chamber into the retort, a charge chamber located at the inlet end of the feeding chamber, a gate between the charge chamber and the feeding chamber, a gas pipe leading directly from the lower end of the retort upward to the lower end of the charge chamber, and another gas pipe leading from the latter in the upper end of the latter to the hydraulic main.

7. In a gas apparatus, the combination of a vertical retort and heating means therefor, a feeding chamber above the retort, mechanical means, operable at variable speed, for effecting a continuous feed from the feeding chamber into the retort, a charge chamber located above the feeding chamber, a gate between the charge chamber and the feeding chamber, a gas pipe leading directly from the lower end of the retort upward to the lower end of the charge chamber, and another gas pipe leading from the latter in the upper end of the latter to the hydraulic main.

JOHN U. McDONALD.